United States Patent
Mushano

(10) Patent No.: US 7,626,731 B2
(45) Date of Patent: Dec. 1, 2009

(54) DOT ANALYSIS DEVICE, DOT ANALYSIS PROGRAM STORAGE MEDIUM, AND DOT ANALYSIS METHOD

(75) Inventor: Mitsuru Mushano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 642 days.

(21) Appl. No.: 11/043,954

(22) Filed: Jan. 28, 2005

(65) Prior Publication Data

US 2005/0168784 A1     Aug. 4, 2005

(30) Foreign Application Priority Data

Jan. 29, 2004   (JP)   ............................. 2004-021519

(51) Int. Cl.
*G06K 15/00*      (2006.01)
*H04N 1/405*      (2006.01)

(52) U.S. Cl. ..................................... 358/3.08; 358/3.07
(58) Field of Classification Search .......... 358/1.9–3.32
See application file for complete search history.

(56) References Cited

U.S. PATENT DOCUMENTS

| 4,989,257 | A | * | 1/1991 | Horowitz | 382/192 |
| 5,590,255 | A | * | 12/1996 | Takeshima et al. | 345/441 |
| 7,064,768 | B1 | * | 6/2006 | Bao | 345/589 |
| 7,064,865 | B2 | * | 6/2006 | Ishikawa | 358/1.9 |
| 2004/0066538 | A1 | * | 4/2004 | Rozzi | 358/2.1 |

FOREIGN PATENT DOCUMENTS

JP    11-155067 A    6/1999

* cited by examiner

*Primary Examiner*—Douglas Q Tran
(74) *Attorney, Agent, or Firm*—Sughrue Mion, PLLC

(57) ABSTRACT

A dot analysis apparatus includes a dot converging section that converges individual dots forming a dot image toward their respective centers, a selecting section that selects plural dot units each consisting of one main dot and plural sub-dots surrounding the main dot from the converged dots, a calculating section that calculates an interval between the main dot and the sub-dots of each dot unit and a direction of arrangement of the main dot and the sub-dots, and a statistic processing section that determines statistic distributions of the interval and the direction calculated for each dot unit by the calculating section and determines the interval and the direction corresponding to the peaks of their respective distributions as the interval between the regularly arranged dots forming the dot image and the direction of the regular arrangement of the dots forming the dot image, respectively.

15 Claims, 15 Drawing Sheets

DOT ANALYSIS DEVICE, DOT ANALYSIS PROGRAM STORAGE MEDIUM, AND DOT ANALYSIS METHOD

BACKGROUND OF THE INVENTION

1. Field of the Invention

The present invention relates to a dot analysis apparatus that analyzes a regular arrangement of dots forming a dot image, a dot analysis program storage medium, and a dot analysis method.

2. Description of the Related Art

Most images printed on recording media, such as paper, are dot images represented by dots. In general, such prints are produced by converting a manuscript into a dot image, printing the dot image onto a film, making a machine plate from the film, and then installing the machine plate in a printing machine. It is common that users have only the print produced by such a process or the film used in plate making and, thus, produce a print by electronically reading the print or film with a color scanner to produce electronic data, making a machine plate for printing based on the electronic data, and then installing the machine plate in a printing machine. In such a case, the printing machine used this time may have a resolution slightly different from that of the printing machine used to produce the print kept as an original or the printing machine expected to be used to produce a print from the machine plate made from the film kept as an original. If the print is produced without being aware of the resolution difference, the resulting image may be significantly degraded, for example, moiré fringes may appear in the image. To address such a problem, there has been known a processing referred to as descreening, which is a processing that converts electronic data obtained by a color scanner or the like from a print or film kept as an original into electronic data representing a smoothed image with a smoothed dot structure using a conversion filter for smoothing fine structures of an image.

In the descreening processing, image data that represents a dot image by a two-dimensional array of pixels assigned with numeric data is processed as described below, for example.

First, a conversion filter that converts image data representing a dot image into image data representing a smoothed image with the dot structure smoothed is prepared. The conversion filter is mathematically represented by a two-dimensional matrix of a predetermined size.

Then, a data processing described below is performed on each of plural pixels forming the image to be processed. First, the matrix representing the conversion filter described above is overlaid on the array of pixels centered on the current target pixel. Then, the values of the elements of the matrix are multiplied by the numeric data of their respective overlapping pixels, and the sum of the products obtained for all the elements of the matrix is calculated. Then, the original numeric data of the target pixel is replaced with the sum of the products.

Performing such a data processing on all the pixels forming the image will be referred to as filtering hereinafter. In the descreening processing, such filtering is performed on the image data one or more times, thereby smoothing the dot structure of the dot image.

In order to accomplish such a descreening efficiently, it is desired that an interval between regularly arranged dots of the dot image and a direction of the regular arrangement of dots of the dot image are grasped as precisely as possible before processing, and an appropriate conversion filter for the interval and direction is prepared.

FIG. 15 is a schematic diagram showing an example of an appropriate conversion filter for an interval between regularly arranged dots of a dot image and a direction of regular arrangement of dots of the dot image.

FIG. 15 shows plural dots P and a conversion filter F overlapping with a dot image formed by the dots P. In the conversion filter F, the elements lie within a square region Q whose side is equal to an interval L between the dots P and which is oriented in the same direction as the arrangement of the dots P are assigned with a constant value other than 0, and the elements outside the region Q are assigned with a value of 0. The filtering described above is performed on the image by shifting the conversion filter represented by such a matrix in the direction of the arrow D in the drawing, and thus, the dot structure of the dot image is efficiently smoothed.

In order to accomplish such an efficient descreening processing, there has been proposed a descreening device that can perform the Fourier transform on the image data representing a dot image to be processed to determine the frequency characteristic of the spatial structure of the image, represent the frequency characteristic by the polar coordinates and calculate an interval between dots of the dot image and a direction of arrangement of the dots from the spatial frequency and angle corresponding to the peak of the frequency characteristic represented by the polar coordinates (for example, see Japanese Patent Laid-Open No. 11-155067, paragraphs [0027] to [0059] and FIG. 1).

However, the calculation of the interval between dots and the direction of arrangement of the dots performed by the descreening device disclosed in Japanese Patent Laid-Open No. 11-155067 (paragraphs [0027] to [0059] and FIG. 1) has a problem that the frequency characteristic determined by performing the Fourier transform on the image data contains much noise, such as undesired frequency components irrelevant to the dot structure, so that the calculation precision is lowered because such noise cannot be completely eliminated by a band pass filter or the like.

Here, the calculation of the interval between dots and the direction of arrangement of dots can be applied not only to the descreening device but also to other processings, such as scaling up and down of a dot image, for example. Therefore, not only the descreening device but also such other processings have the same problem of the lowering of the calculation precision.

SUMMARY OF THE INVENTION

The present invention has been made in view of the above circumstances and provides a dot analysis apparatus that precisely calculate an interval between regularly arranged dots of a dot image and a direction of arrangement of the dots, a dot analysis program storage medium that stores a dot analysis program that is executed in a computer to make the computer operate as such a dot analysis apparatus, and a dot analysis method for precisely calculating an interval between regularly arranged dots of a dot image and a direction of arrangement of the dots.

The present invention provides a dot analysis apparatus that determines an interval between regularly arranged dots that represent a dot image and a direction of the regular arrangement of the dots, including:

a dot converging section that converges the individual dots forming the dot image toward the respective centers; and a computing section that calculates an interval between the regularly arranged dots forming the dot image and a direction of the regular arrangement of the dots based on plural dots converged by the dot converging section.

The dot analysis apparatus according to the present invention can enhance the dot arrangement because the dot converging section converges the individual dots forming the dot image toward their respective centers. In addition, since the computing section calculates an interval between the dots and a direction of arrangement of the dots based on the enhanced dot arrangement, the dot analysis apparatus according to the present invention can precisely calculate the interval between the regularly arranged dots forming the dot image and the direction of the regular arrangement of the dots.

In the dot analysis apparatus according to the present invention, it is preferred that the computing section further includes:

a selecting section that selects a dot unit from the plural dots converged by the dot converging section, the dot unit consisting of one main dot and plural sub-dots surrounding the main dot; and a calculating section that calculates intervals between the main dot and the sub-dots of the dot unit selected by the selecting section and directions of arrangement of the main dot and the sub-dots and calculates the interval between the regularly arranged dots forming the entire dot image and the direction of the regular arrangement of the dots based on the calculation result.

With such a computing section, the interval between the regularly arranged dots forming the entire dot image and the direction of the regular arrangement of the dots can be readily calculated.

Furthermore, in the dot analysis apparatus having such a computing section, it is preferred that, in the computing section, the selecting section selects plural dot units, the calculating section calculates intervals between the main dot and the sub-dots of each of the plural dot units selected by the selecting section and directions of arrangement of the main dot and the sub-dots of each of the plural dot units, and the computing section further comprises a statistic processing section that determines statistic distributions of the interval and direction calculated for each dot unit by the calculating section and determines an interval and a direction corresponding to peaks of the respective distributions as the interval between the regularly arranged dots forming said dot image and the direction of the regular arrangement of the dots, respectively.

The dot analysis apparatus having such a computing section can more precisely calculate the interval between the regularly arranged dots forming the entire dot image and the direction of the regular arrangement of the dots.

The dot analysis apparatus according to the invention can be provided by executing the dot analysis program according to the present invention in a computer.

A dot analysis program storage medium according to the present invention is a dot analysis program storage medium that stores a dot analysis program that is executed in a computer to make the computer operate as a dot analysis apparatus that determines an interval between regularly arranged dots that represent a dot image and a direction of the regular arrangement of the dots, in which the dot analysis program makes the computer operate as a dot analysis apparatus comprising:

a dot converging section that converges the individual dots forming the dot image toward the respective centers; and a computing section that calculates an interval between the regularly arranged dots forming the dot image and a direction of the regular arrangement of the dots based on plural dots converged by the dot converging step.

The dot analysis apparatus according to the present invention can be readily implemented by executing the dot analysis program according to the present invention in the computer.

In addition, a dot analysis method according to the present invention is a dot analysis method of determining an interval between regularly arranged dots that represent a dot image and a direction of the regular arrangement of the dots, including the steps of:

converging the individual dots forming the dot image toward the respective centers; and calculating an interval between the regularly arranged dots forming the dot image and a direction of the regular arrangement of the dots based on plural dots converged by the step of converging the individual dots.

With the dot analysis method according to the present invention, as with the dot analysis apparatus according to the present invention and the computer in which the dot analysis program according to the present invention is executed, the interval between the regularly arranged dots forming the dot image and the direction of the regular arrangement of the dots can be precisely calculated.

As for the dot analysis program and the dot analysis method according to the present invention, only basic forms thereof are described in this specification. However, this is simply intended to avoid redundancy, and the dot analysis program and the dot analysis method according to the present invention can have various forms corresponding to various forms of the dot analysis apparatus described above, in addition to the basic forms described herein.

In addition, the dot analysis apparatus and the dot analysis program according to the present invention have components of the same names, such as dot converging section and arithmetic section. However, the components of the dot analysis program are software that provides such functions, and the components of the dot analysis apparatus may be software or hardware that provides such functions.

In addition, as for the components of the dot analysis program according to the present invention, such as the dot converging section, the function of one component may be provided by one program component or plural program components, or the functions of plural components may be provided by one program component. Furthermore, the components may provide such functions by themselves or instruct another program or program component in the computer to provide such functions.

As described above, the dot analysis apparatus, the dot analysis program storage medium, and the dot analysis method according to the present invention enable precise calculation of an interval and a direction of regularly arranged dots forming a dot image.

DETAILED DESCRIPTION OF THE INVENTION

In the following, embodiment of the present invention will be described.

Figure 1:
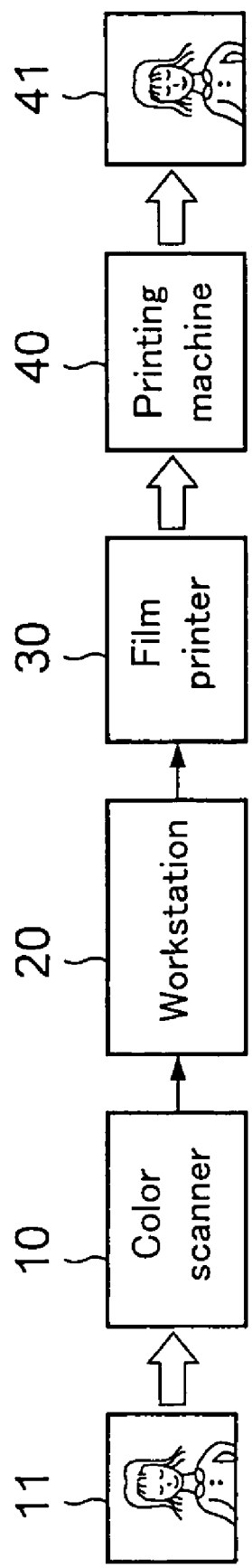
FIG. 1 is a diagram showing a whole configuration of an image capturing/printing system incorporating a dot analysis apparatus according to an embodiment of the present invention.

FIG. 1 is a diagram showing a whole configuration of an image capturing/printing system incorporating a dot analysis apparatus according to an embodiment of the present invention.

A color scanner 10 captures an original image 11 and creates color-separated image data for C, M and Y colors that represent the captured original image 11. The image data for C, M and Y colors are input to a workstation 20. Using the workstation 20, an operator performs electronic assembly of the input image data, thereby creating image data that represents an image for printing. In this electronic assembly, the image data is created temporarily in the form of description language data described in a page description language (PDL), and then, a raster image processor (RIP) converts the image data into image data for printing that is developed in a bitmap configuration and associated with four colors of C, M, Y and K.

The image data for printing is input to a film printer 30, which produces a printing film original plate for each of the colors C, M, Y and K based on the input image data.

From the printing film original plates, a machine plate is produced, and the machine plate is installed in a printing machine 40. Inks are applied to the machine plate installed in the printing machine 40, the applied inks are transferred onto a printing sheet of paper, thereby forming a print image 41 on the sheet of paper.

Here, characteristics of the image capturing/printing system according to this embodiment of the present invention shown in FIG. 1 relate to processings conducted in the workstation 20, and therefore, the workstation 20 will be described first.

In the workstation 20, during the electronic assembly described above, the dot structure of the dot image represented by the input image data is analyzed, and descreening is performed based on the analysis result to adequately smooth the dot structure. Then, the image data representing the image for printing is produced based on the image data having been subjected to the descreening. Here, the dot analysis and the descreening will be described later. Now, a hardware configuration of the workstation 20 will be described.

Figure 2:
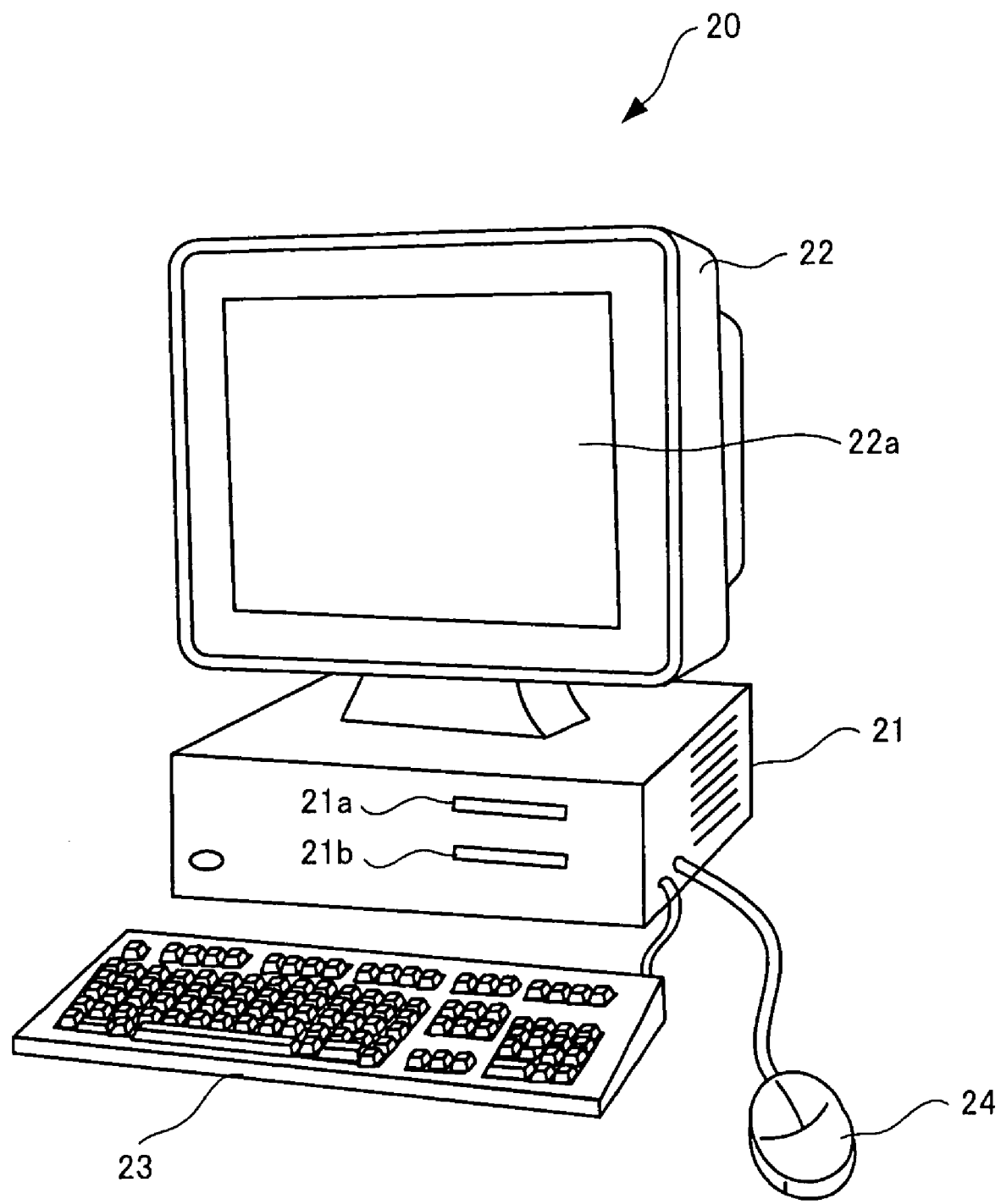
FIG. 2 is a perspective view of a workstation 20 shown by one block in FIG. 1.
Figure 3:
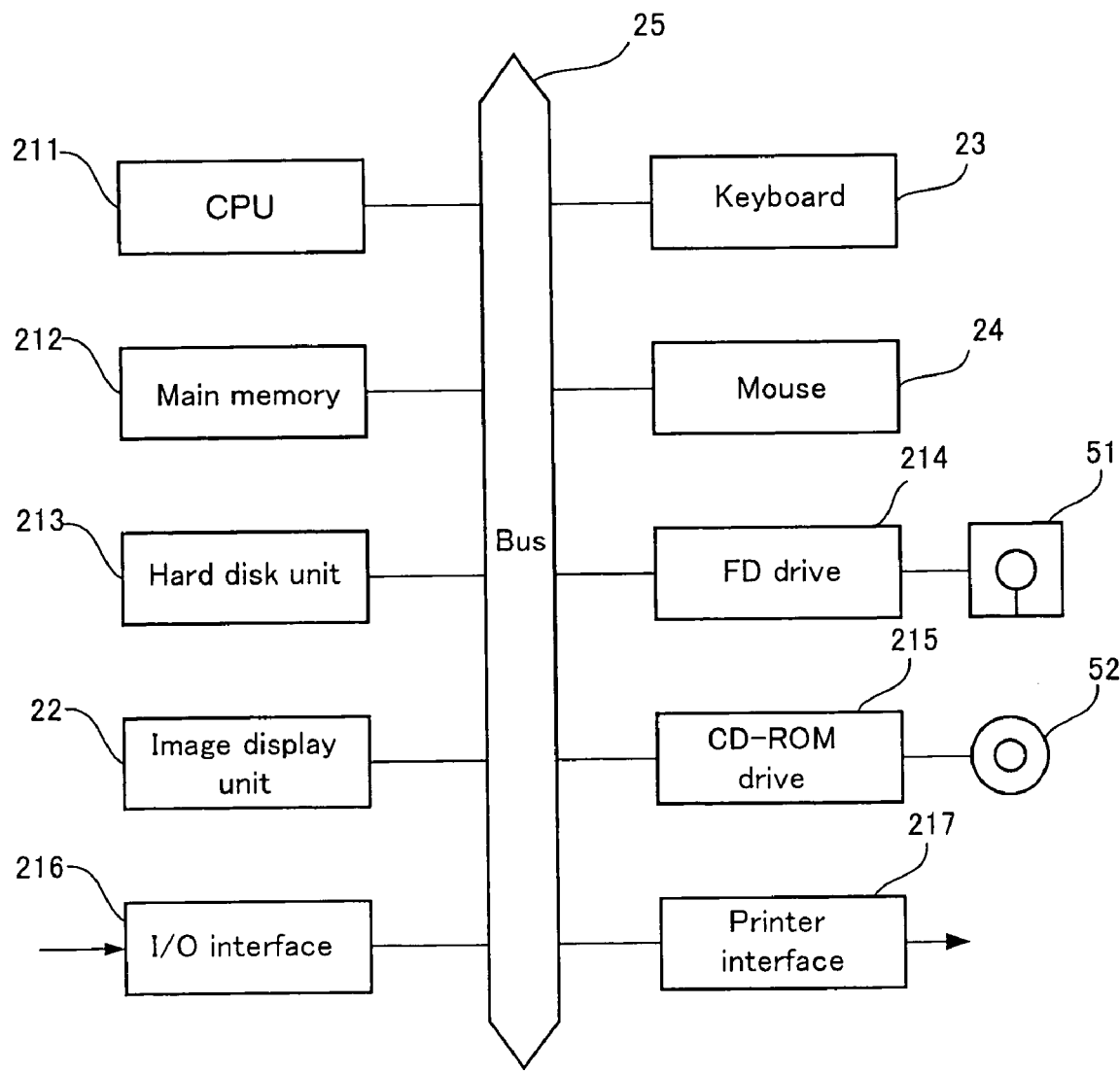
FIG. 3 shows a hardware configuration of the workstation 20.

FIG. 2 is a perspective view of the workstation 20 shown by one block in FIG. 1, and FIG. 3 shows a hardware configuration of the workstation 20.

Viewed from the outside, the workstation 20 includes a main unit 21, an image display unit 22 that displays an image on a display screen 22*a* in response to an instruction from the main unit 21, a keyboard 23 for input of various kinds of information into the main unit 21 according to key manipulations, and a mouse 24 for pointing at an icon or the like displayed at any point in the display screen 22*a* for inputting the instruction assigned to the icon or the like. Viewed from the outside, the main unit 21 has a flexible disk loading slot 21*a* for loading of a flexible disk and a CD-ROM loading slot 21*b* for loading of a CD-ROM.

As shown in FIG. 3, the main unit 21 incorporates a CPU 211 that executes various programs, a hard disk unit 213 that stores various programs, data and the like, a main memory 212 in which a program read from the hard disk unit 213 is developed for execution by the CPU 211, an FD drive 214 for accessing a flexible disk 51 loaded thereto, a CD-ROM drive 215 for accessing a CD-ROM 52 loaded thereto, an I/O interface 216 connected to the color scanner 10 (see FIG. 1) for receiving image data from the color scanner 10, and a printer interface 217 for transmitting image data to the film printer 30. These components and the image display unit 22, the keyboard 23 and the mouse 24 shown in FIG. 2 are interconnected via a bus 25.

The CD-ROM 52 stores a descreening program that makes the workstation 20 operate as a descreening apparatus incorporating a dot analysis apparatus. The descreening program incorporates a dot analysis program that makes the workstation 20 operate as the dot analysis apparatus. Once the CD-ROM 52 is loaded into the CD-ROM drive 215, the descreening program incorporating the dot analysis program is uploaded from the CD-ROM 52 to the workstation 20 and stored in the hard disk unit 213.

Here, if the dot analysis program incorporated in the descreening program and stored in the CD-ROM 52 is the dot analysis program according to an embodiment of the present invention, it corresponds to the dot analysis program according to an embodiment of the present invention regardless of whether it is uploaded from the CD-ROM 52 into the hard disk unit 213 or it is downloaded into the flexible disk 51.

In the following, a dot analysis apparatus according to an embodiment of the present invention, a dot analysis program according to an embodiment of the present invention, and a dot analysis method according to an embodiment of the present invention will be described, and then, applications thereof to the descreening apparatus will be described.

Figure 4:
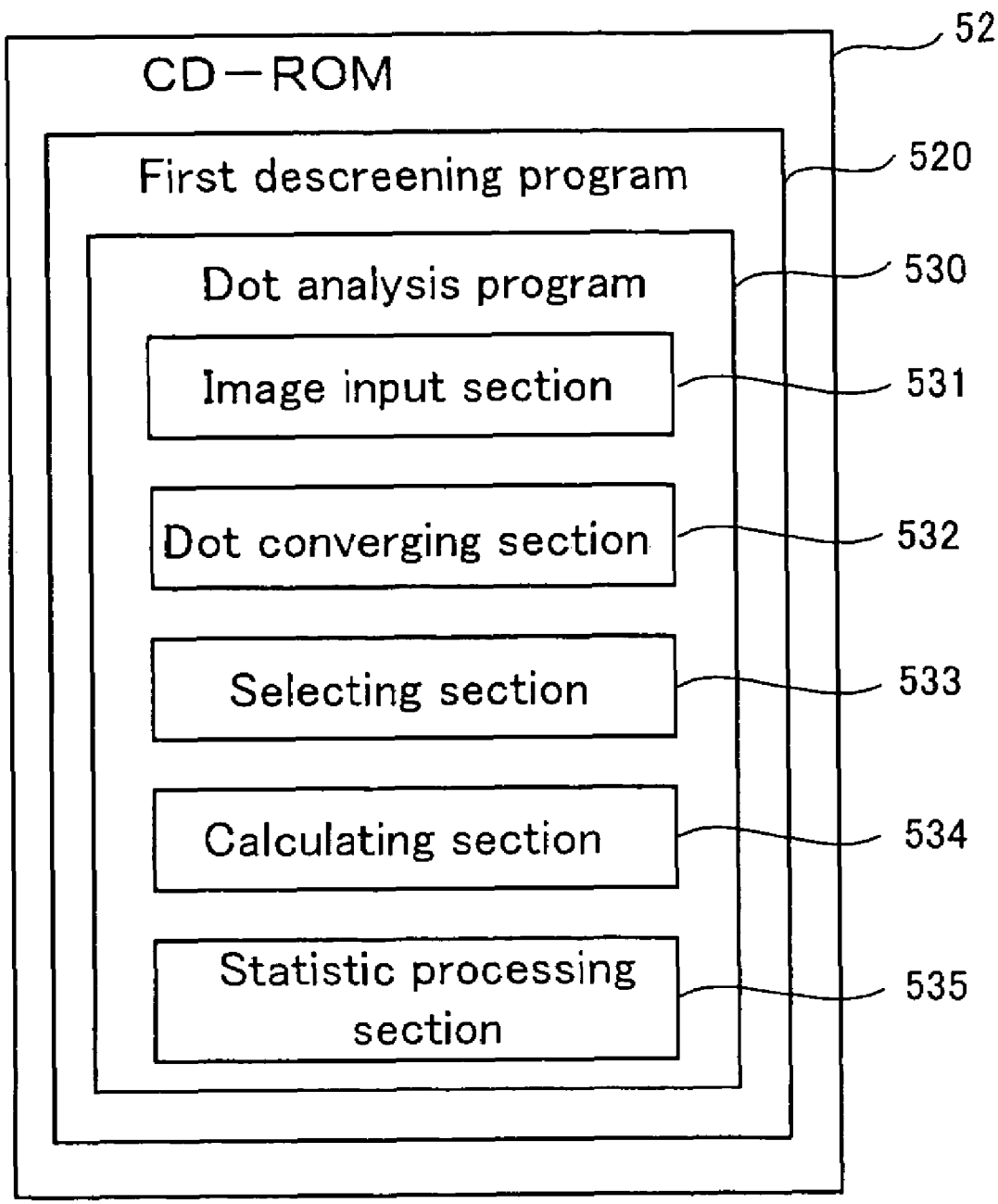
FIG. 4 shows a dot analysis program storage medium according to an embodiment of the present invention.

FIG. 4 shows a dot analysis program storage medium according to an embodiment of the present invention.

As can be seen from the drawing, a dot analysis program 530 is incorporated in a first descreening program 520 that is stored in the CD-ROM 52.

The dot analysis program 530 is executed in the workstation 20 shown in FIGS. 1 and 2 and makes the workstation 20 operate as the dot analysis apparatus that converts input image data into a smoothed image with the dot structure smoothed. The dot analysis program 530 includes an image input section 531, a dot converging section 532, a selecting section 533, a calculating section 534 and a statistic processing section 535.

The image input section 531 serves to receive image data from the color scanner 10 shown in FIG. 1. The dot converging section 532 serves to converge the individual dots forming the dot image represented by the image data toward their respective centers. The selector section 533 serves to select plural dot units, each consisting of one main dot and plural sub-dots around the main dot, from the dots converged by the dot converging section 532. The calculator section 534 serves to calculate an interval between the main dot and the sub-dots of each of the plural dot units selected by the selecting section 533 and a direction of arrangement of the main dot and the sub-dots of each of the plural dot units selected by the selecting section 533. The statistic processing section 535 serves to determine statistic distributions of the interval and the direction calculated for each dot unit by the calculating section 534 and determine the interval and the direction corresponding to the peaks of their respective distributions as the interval between the regularly arranged dots forming the dot image and the direction of the regular arrangement of the dots forming the dot image, respectively.

Figure 5:
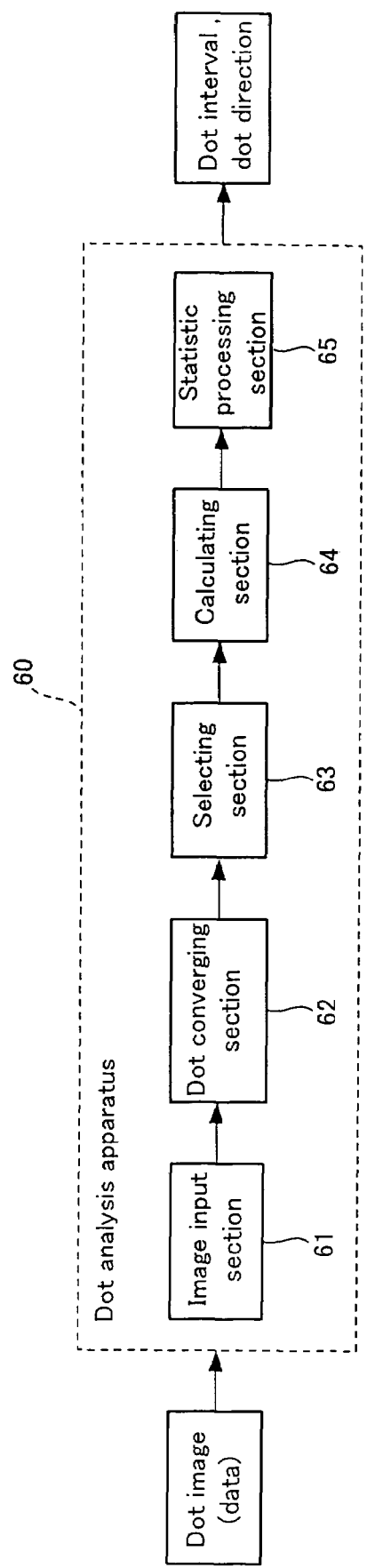
FIG. 5 is a block diagram showing a dot analysis apparatus according to an embodiment of the present invention.

FIG. 5 is a block diagram showing a dot analysis apparatus according to an embodiment of the present invention.

A dot analysis apparatus 60 is implemented by the dot analysis program 530 shown in FIG. 4 installed and executed in the workstation 20 shown in FIGS. 1 and 2.

The dot analysis apparatus 60 includes an image input section 61, a dot converging section 62, a selecting section 63, a calculating section 64 and a statistic processing section 65. The image input section 61, the dot converging section 62, the selecting section 63, the calculating section 64 and the statistic processing section 65 correspond to the image input section 531, the dot converging section 532, the selecting section 533, the calculating section 534 and the statistic processing section 535 of the dot analysis program 530 shown in FIG. 4, respectively. However, the components of the dot analysis apparatus 60 shown in FIG. 5 are composed of a combination of hardware of the workstation 20 shown in FIGS. 1 and 2 and an OS of the workstation 20 or an application program executed in the workstation 20, while the components of the dot analysis program 530 shown FIG. 4 are composed only of an application program.

The image input section 61 receives image data from the color scanner 10 shown in FIG. 1. The dot converging section 62 converges the individual dots forming the dot image represented by the image data toward their respective centers. The selector section 63 selects plural dot units, each consisting of one main dot and plural sub-dots around the main dot, from the dots converged by the dot converging section 62. The calculator section 64 calculates an interval between the main dot and the sub-dots of each of the plural dot units selected by the selecting section 63 and a direction of arrangement of the main dot and the sub-dots of each of the plural dot units selected by the selecting section 63. The statistic processing section 65 determines statistic distributions of the interval and the direction calculated for each dot unit by the calculating section 64 and determines the interval and the direction corresponding to the peaks of their respective distributions as the interval between the regularly arranged dots of the dot image and the direction of the regular arrangement of the dots of the dot image, respectively.

Figure 6:
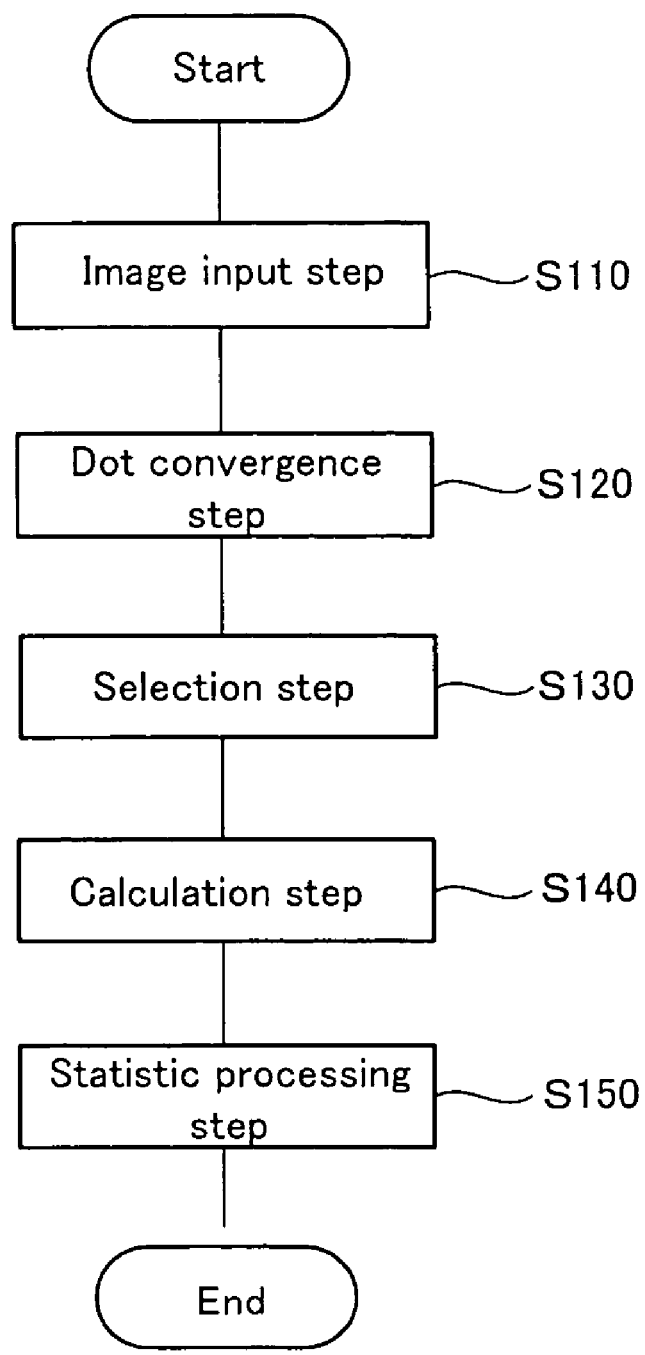
FIG. 6 is a flowchart illustrating a dot analysis method according to an embodiment of the present invention.

FIG. 6 is a flowchart showing a dot analysis method according to an embodiment of the present invention.

The dot analysis method includes an image input step (step S110), a dot convergence step (step S120), a selection step (step S130), a calculation step (step S140) and a statistic processing step (step S150).

The image input step (step S110), the dot convergence step (step S120), the selection step (step S130), the calculation step (step S140) and the statistic processing step (step S150) of the dot analysis method shown in the flowchart of FIG. 6 correspond to the operations of the image input section 61, the dot converging section 62, the selecting section 63, the calculating section 64 and the statistic processing section 65 of the dot analysis apparatus 60 shown in FIG. 5, respectively, which are provided by the image input section 531, the dot converging section 532, the selecting section 533, the calculating section 534 and the statistic processing section 535 of the dot analysis program 530 shown in FIG. 4, respectively.

The image input step (step S110) is a step to receive image data from the color scanner 10 shown in FIG. 1. The dot convergence step (step S120) is a step to converge the individual dots forming the dot image represented by the image data toward their respective centers. The selection step (step S130) is a step to select plural dot units, each consisting of one main dot and plural sub-dots around the main dot, from the dots converged in the dot convergence step (step S120). The calculation step (step S140) is a step to calculate an interval between the main dot and the sub-dots of each of the plural dot units selected in the selection step (step S130) and a direction of arrangement of the main dot and the sub-dots of each of the plural dot units selected by the selection step (step S130). The statistic processing step (step S150) is a step to determine statistic distributions of the interval and the direction calculated for each dot unit calculated in the calculation step (step S140) and determine the interval and the direction corresponding to the peaks of their respective distributions as the interval between the regularly arranged dots of the dot image and the direction of the regular arrangement of the dots of the dot image, respectively.

Now, the dot convergence step (step S120), the selection step (step S130), the calculation step (step S140) and the statistic processing step (step S150) shown in the flowchart of FIG. 6 will be described in detail. In the following, by describing the steps shown in the flowchart of FIG. 6, there will be described the operations of the dot converging section 532, the selecting section 533, the calculating section 534 and the statistic processing section 535 in the first descreening program 520 shown in FIG. 4, and the dot converging section 62, the selecting section 63, the calculating section 64 and the statistic processing section 65 of the dot analysis apparatus 60 shown in FIG. 5.

First, the dot convergence step shown in FIG. 6 will be described.

The dot convergence processing performed in this step involves repeating a predetermined number of times a numeric conversion described below with reference to FIG. 7 for each of the pixels forming the dot image and assigned with numeric data.

Figure 7:
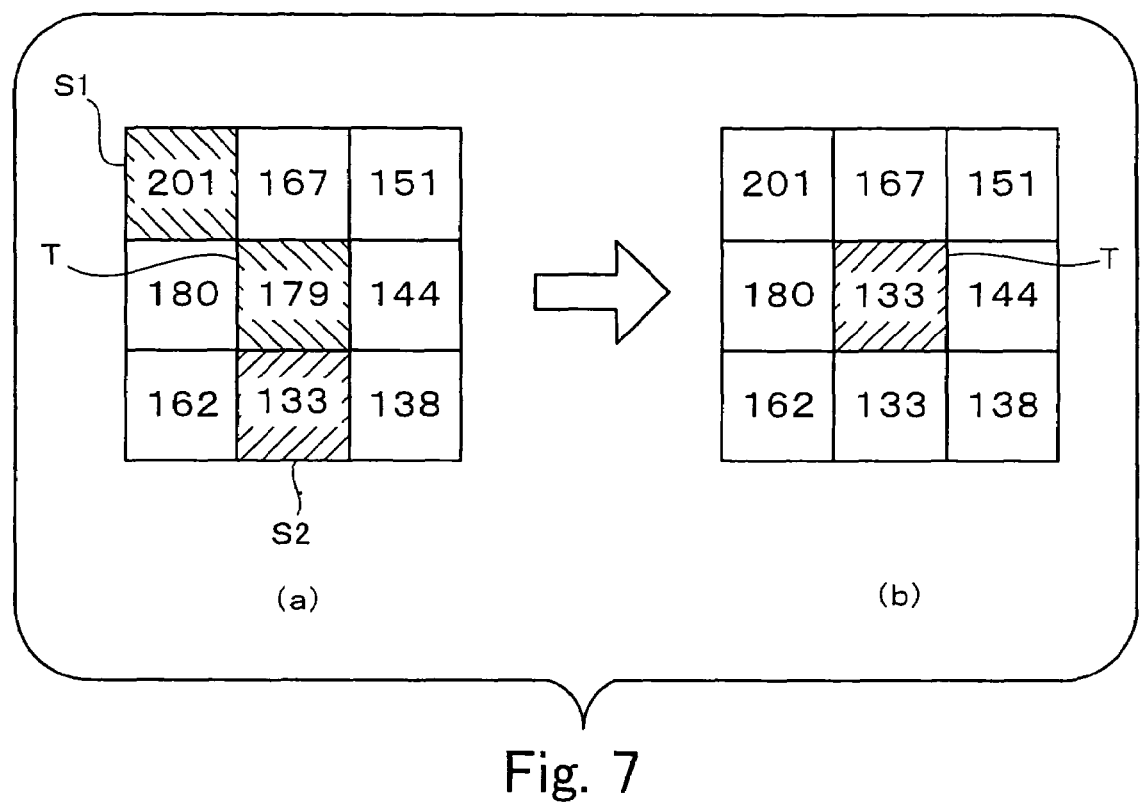
FIG. 7 shows an example of a numeric conversion performed on a target pixel.

FIG. 7 shows an example of the numeric conversion performed on a target pixel.

FIG. 7 shows a two-dimensional array of nine pixels each assigned with numeric data. Of the nine pixels arranged in a square configuration, a center pixel T is the target pixel for the numeric conversion. Part (a) of FIG. 7 shows the target pixel yet to be subjected to the numeric conversion along with the surrounding pixels, and part (b) of FIG. 7 shows the target pixel subjected to the numeric conversion along with the surrounding pixels.

In the numeric conversion shown in FIG. 7, if any of the eight pixels surrounding the target pixel T is assigned with numeric data equal to or greater than the numeric data of the target pixel T, the numeric data of the target pixel T is replaced with the minimum of the numeric data of the surrounding eight pixels.

In the example shown in FIG. 7, the target pixel T is assigned with numeric data of "179". The numeric data "179" is compared with the numeric data of the surrounding eight pixels. Then, it is found that, of the eight pixels, a pixel S1 is assigned with numeric data of "201", which is greater than the numeric data "179" of the target pixel T. Thus, according to the processing described above, the numeric data "179" of the target pixel T is replaced with the minimum of the numeric data of the surrounding eight pixels. In this example, of the eight pixels, assigned with the minimum numeric data is a pixel S2, which is located in the middle of the bottom row in FIG. 7, and the numeric data thereof is "133". That is, the numeric data "179" of the target pixel T is replaced with the numeric data "133" of the pixel S2.

The dot convergence processing described above involves repeating a predetermined number of times such a numeric conversion for each of the pixels forming the dot image and assigned with numeric data. This dot convergence processing preserves the numeric data of a pixel if the pixel is assigned with the greatest numeric data among the surrounding pixels. On the other hand, if a pixel is assigned with numeric data that is equal to or greater than that of any of the surrounding pixels, the numeric data of the pixel is replaced with smaller numeric data each time the pixel is subjected to the numeric conversion.

Each time each pixel is subjected to the numeric conversion in the dot convergence processing, the numeric data of the pixels corresponding to the dots of the dot image are replaced with smaller numeric data from the pixels corresponding to surrounding dots to the pixel corresponding to the central dot, and eventually, only the pixel corresponding to the central dot remains having the original numeric data. As a result, the dots are converged toward their respective centers.

Figure 8:
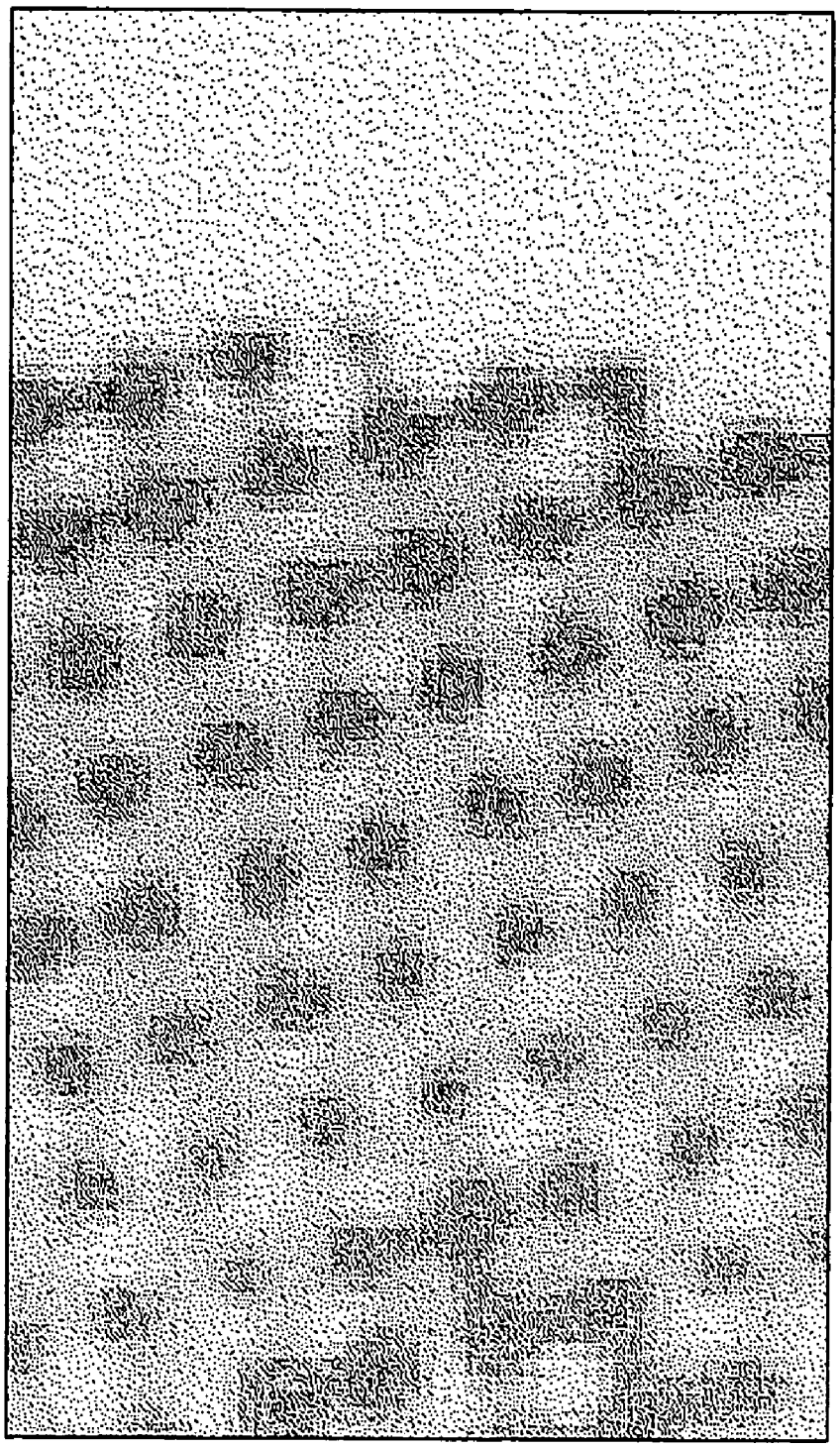
FIG. 8 shows an image yet to be subjected to the numeric conversion.
Figure 9:
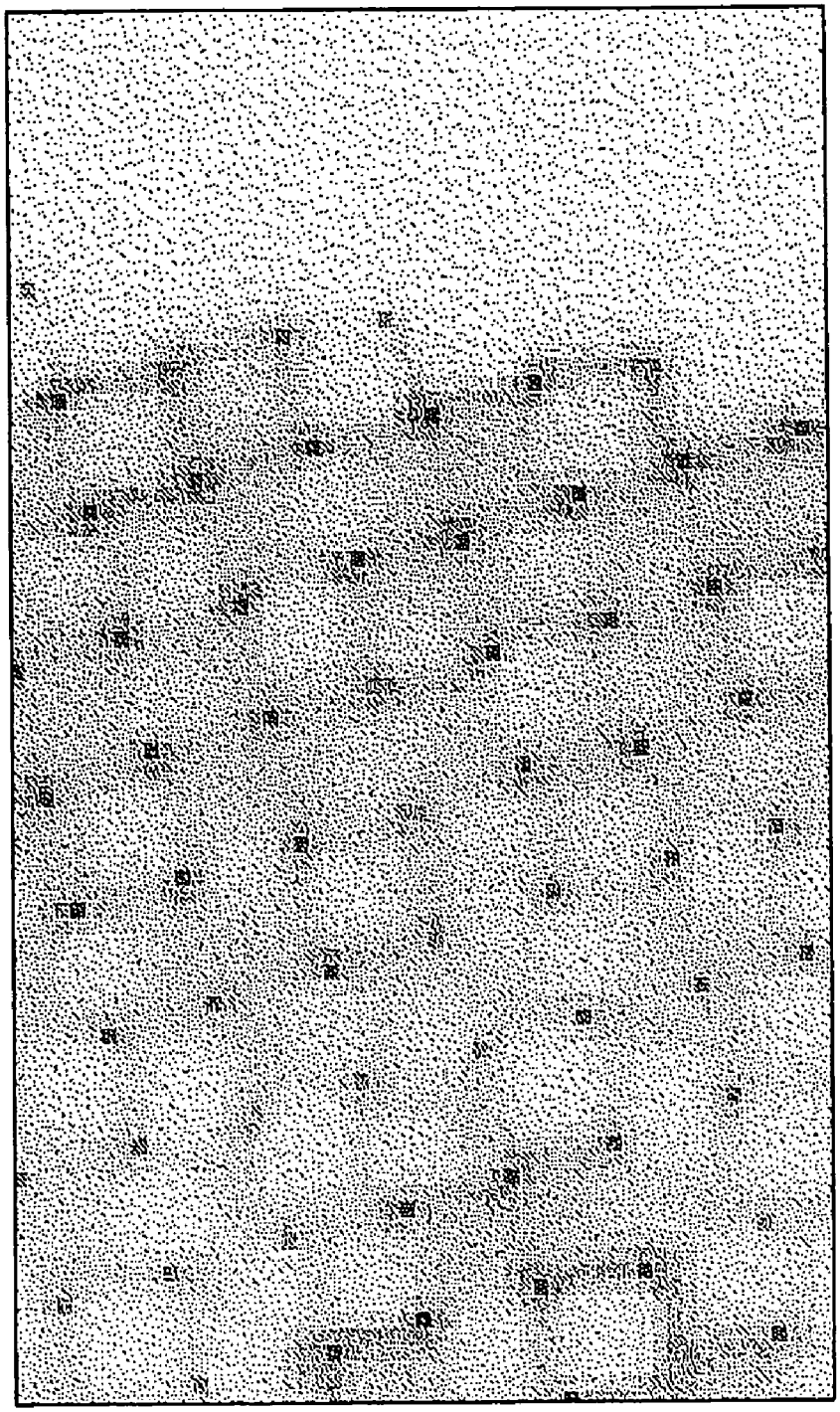
FIG. 9 shows an image subjected to one numeric conversion.
Figure 10:
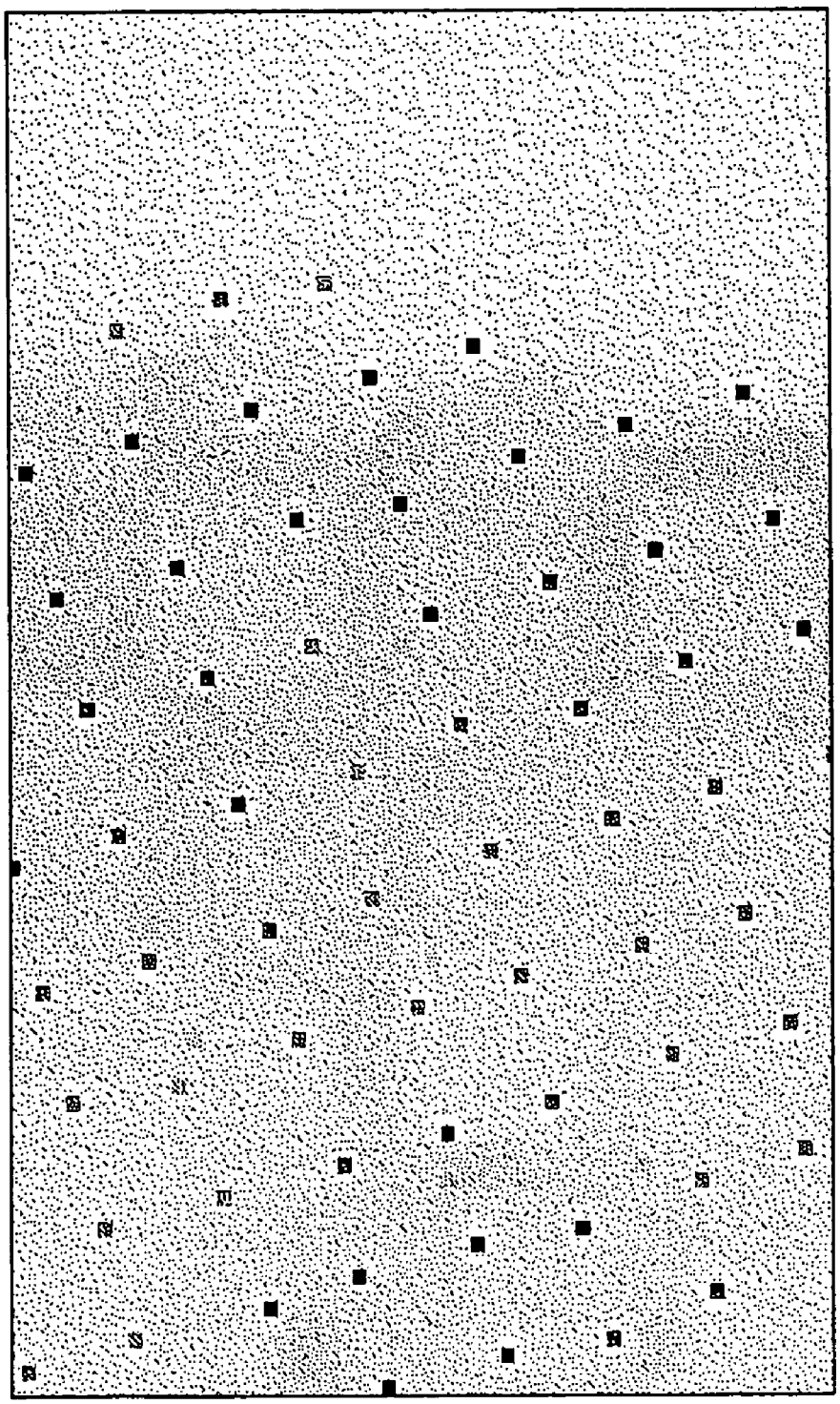
FIG. 10 shows an image subjected to five numeric conversions.

FIGS. 8 to 10 show an example of the dot convergence processing described above. FIG. 8 shows a dot image yet to be subjected to the dot convergence processing, FIG. 9 shows a dot image subjected to the dot convergence processing including one numeric conversion performed on each of the pixels forming the dot image, and FIG. 10 shows a dot image subjected to the dot convergence processing including five numeric conversions performed on each of the pixels forming the dot image. Through the repetition of the numeric conversion, the dots that are dispersed and appear blurred in FIG. 8 are converged toward their respective centers as shown in FIG. 10. In the dot convergence step (step S120) shown in FIG. 6, the dots are converged into the state shown in FIG. 10, and then, binarization is performed on the image with the dots converged. By the binarization, the numeric data of the pixels equal to or greater than a predetermined threshold are replaced with "1", and the numeric data of the pixels smaller than the predetermined threshold are replaced with "0". The binarization removes the background image that excludes the converged dots from the image shown in FIG. 10. In this way, the dot analysis described below can be achieved with high precision.

In the following, the selection step (step S130) and the calculation step (step S140) shown in the flowchart of FIG. 6 will be described in detail.

Figure 11:
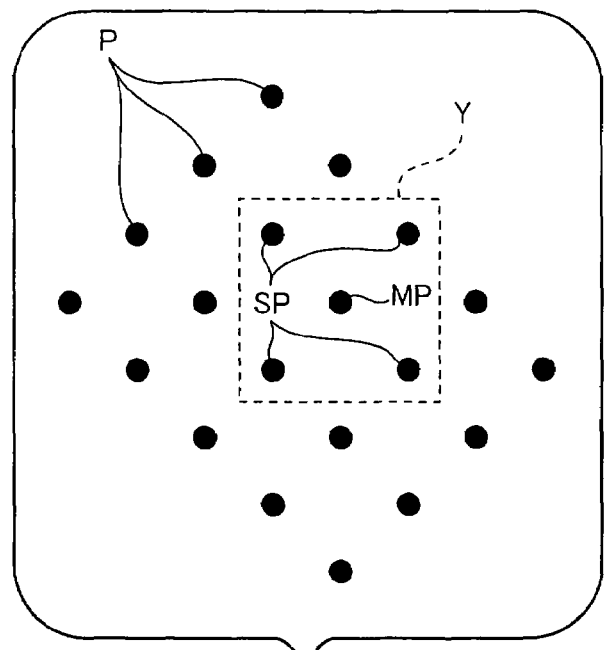
FIG. 11 is a schematic diagram showing a selection of a dot unit in a selection step shown in FIG. 6.

FIG. 11 is a schematic diagram showing a selection of a dot unit in the selection step shown in FIG. 6.

FIG. 11 shows an array of plural dots P converged in the dot convergence step (step S120) in FIG. 6 and one dot unit Y consisting dots selected from among the dots P. The dot unit Y consists of one main dot MP and four sub-dots SP. In the selection step (step S130) shown in FIG. 6, a number of such dot units are selected from the whole dot image.

Figure 12:
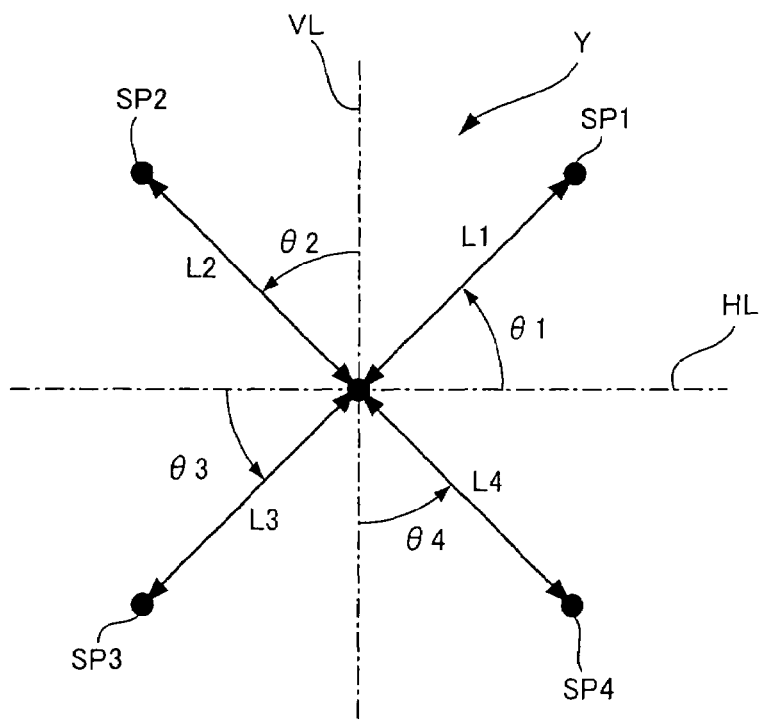
FIG. 12 is a diagram for illustrating a calculation step shown in FIG. 6.

FIG. 12 is a diagram for illustrating the calculation step shown in FIG. 6.

FIG. 12 is an enlarged diagram of the dot unit Y in FIG. 11.

First, the intervals L1, L2, L3 and L4 between the main dot MP and the four sub-dots SP1, SP2, SP3 and SP4, respectively, in the dot unit Y are calculated.

Then, the angle $\theta 1$ between the line connecting the main dot MP and the sub-dot SP1 and the horizontal axis HL in FIG. 12, the angle $\theta 2$ between the line connecting the main dot MP and the sub-dot SP2 and the vertical axis VL in FIG. 12, the angle $\theta 3$ between the line connecting the main dot MP and the sub-dot SP3 and the horizontal axis HL in FIG. 12, and the angle $\theta 4$ between the line connecting the main dot MP and the sub-dot SP4 and the vertical axis VL in FIG. 12 are calculated.

In the calculation step (step S140) shown in FIG. 6, such calculations are performed for all the dot units selected in the selection step (step S130) in FIG. 6.

Now, the statistic processing step (step S150) shown in the flowchart of FIG. 6 will be described in detail.

Both the intervals and angles calculated in the calculation step (step S140) have nearly equal values, because the dots in the dot image are regularly arranged. In the statistic processing step (step S150) shown in FIG. 6, first, distributions of the calculated intervals and angles are each determined in the form of a histogram or the like. Then, in the interval distribution, an interval corresponding to a peak of the interval distribution is determined as the interval between the dots in the dot image. In addition, in the angle distribution, an angle corresponding to a peak of the angle distribution is determined as the direction of arrangement of the dots in the dot image.

In this way, according to this embodiment, the interval between the regularly arranged dots of the dot image and the direction of the regular arrangement of the dots can be calculated precisely.

In the embodiment described above, the selecting section of the dot analysis apparatus according to the present invention, the selecting section of the dot analysis program according to the present invention, and the selection step of the dot analysis method according to the present invention select plural dot units from the dots converged toward their respective centers. However, the present invention is not limited thereto, and only one dot unit may be selected. In such a case, the calculating section of the dot analysis apparatus, the calculating section of the dot analysis program and the calculation step of the dot analysis method determine the four intervals and four angles concerning the combinations of the main dot and four sub-dots of the one dot unit, and the statistic processing section of the dot analysis apparatus, the statistic processing section of the dot analysis program and the statistic processing step of the dot analysis method perform a simplified statistic processing (averaging, for example) of the four intervals and four angles to determine the interval between the dots in the dot image and the direction of arrangement of the dots in the dot image.

Furthermore, in the above description of this embodiment, the statistic processing section of the dot analysis apparatus, the statistic processing section of the dot analysis program and the statistic processing step of the dot analysis method determine the interval distribution and the angle distribution for the plural intervals and plural angles for the plural dot units and determine the interval and the angle corresponding to the peaks of their respective distributions as the interval between the dots in the dot image and the direction of arrangement of the dots in the dot image. However, the present invention is not limited thereto, and the statistic processing section of the dot analysis apparatus, the statistic processing section of the dot analysis program and the statistic processing step of the dot analysis method may take averages of the plural intervals and plural angles for the plural dot units and determines the average interval and the average angle as the interval between the dots in the dot image and the direction of arrangement of the dots in the dot image.

Now, a descreening processing performed by a first descreening apparatus incorporating the embodiment described above will be described. In the following, for the convenience of explanation, the descreening processing performed by the first descreening apparatus will be referred to as a first descreening processing.

The first descreening processing corresponds to an operation of a descreening apparatus implemented by the workstations 20 shown in FIGS. 1 and 2 with the first descreening program 520 shown in FIG. 4 installed and executed therein.

In the following, the first descreening processing will be described.

Figure 13:
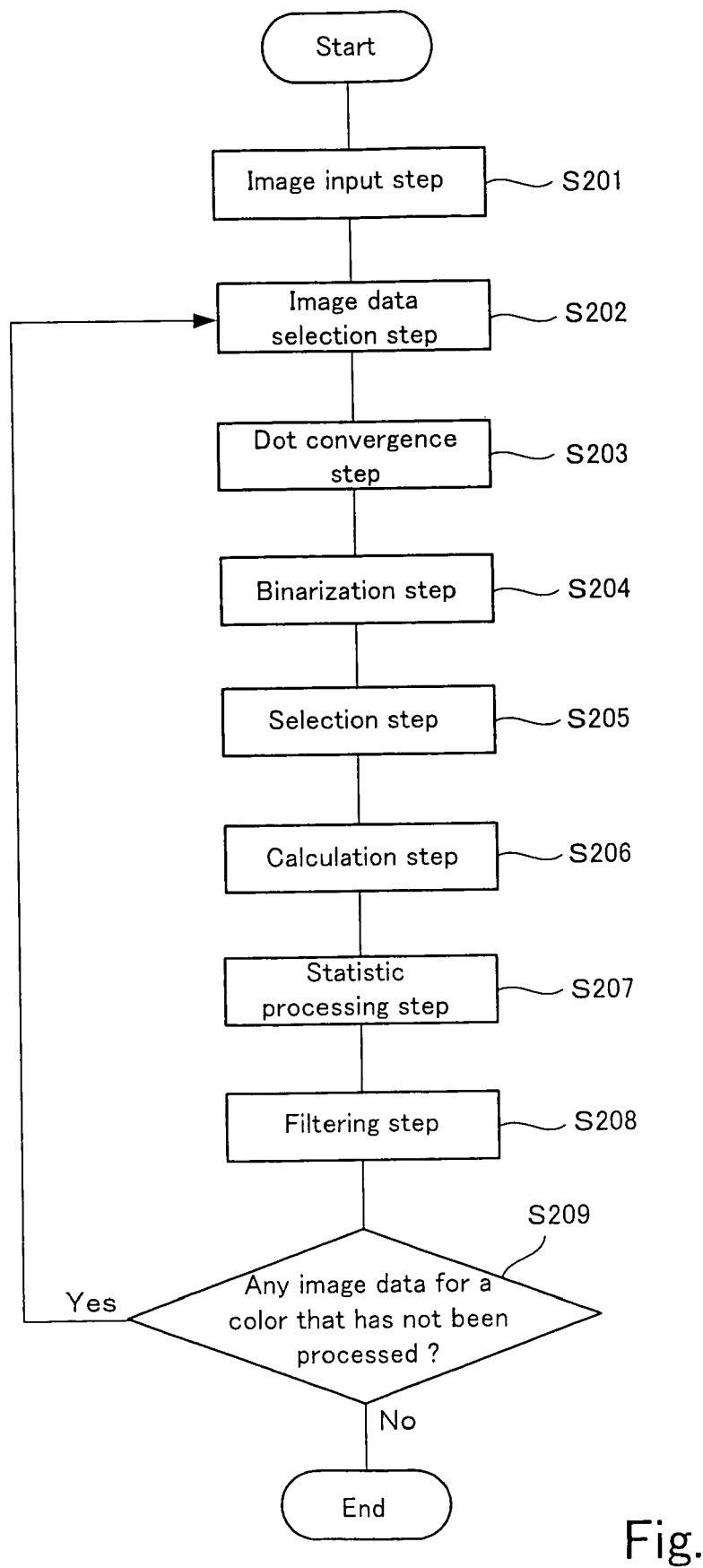
FIG. 13 is a flowchart for illustrating a first descreening processing.

FIG. 13 is a flowchart illustrating the first descreening processing.

The descreening processing illustrated in the flowchart of FIG. 13 is a processing to be performed on image data for printing for the four colors of C, M, Y and K that are kept as originals.

In the flowchart of FIG. 13, steps S201 to S207 correspond to an example of the dot analysis method according to the present invention.

When producing a print from such originals, as described above, it is to be noted that the printing machine used this time may have a resolution slightly different from that of the expected printing machine in which the machine plate made from the image data for printing is to be installed. Thus, to avoid disadvantages caused by the difference, such as moiré fringes, the descreening processing described below is performed on the image data retained as originals, for example.

First, in an image input step (step S201), image data for printing for the four colors of C, M, Y and K are input. Then, in an image data selection step (step S202), image data for one of the colors is selected from among the image data for printing for the four colors.

Then, dot convergence is performed (step S203) on the image data selected in the image data selection step (step S202), and furthermore, binarization is performed on the image with the dots converged (step S204). Through these steps, dots forming the dot image are extracted from the image data.

Then, selection from the extracted dots is performed (step S205). In this step, plural dot units described above are selected from among the extracted dots.

A calculation is performed (step S206) on the plural dot units selected in step S205. In this step, an interval between the main dot and the sub-dots of each of the plural dot units and a direction of arrangement of the main dot and the sub-dots of each of the plural dot units are calculated.

Then, a statistic processing is performed for the interval and the direction (step S207). In this step, statistic distributions of the interval and the direction are determined, and the interval and the direction corresponding to the peaks of their respective distributions are determined as the interval between the dots of the dot image represented by the image data selected in step S202 and the direction of arrangement of the dots forming the dot image represented by the image data selected in step S202, respectively.

Figure 15:
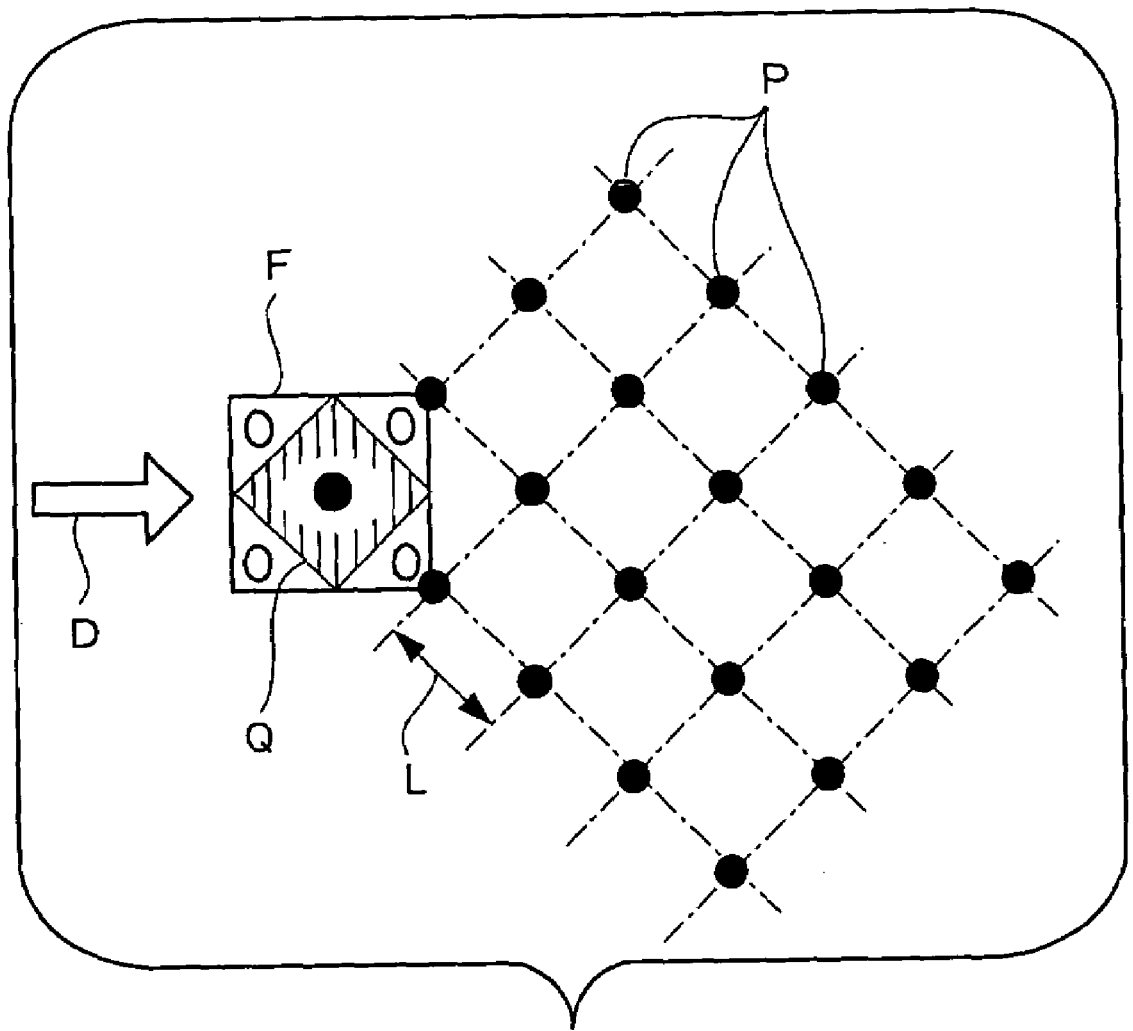
FIG. 15 is a schematic diagram showing an example of an appropriate conversion filter for an interval between regularly arranged dots forming a dot image and a direction of the regular arrangement of the dots forming the dot image.

Based on the interval between the dots of the dot image and the direction of arrangement of the dots of the dot image obtained through the steps described above, an appropriate conversion filter, such as one described with reference to FIG. 15, is prepared. Then, filtering using the conversion filter is performed on the image data selected in step S202 (step S208). In this way, descreening of the image data is accomplished.

Then, it is determined whether any of the image data for printing for the four colors C, M, Y and K that are input to the descreening apparatus in the image input step (step S201) has not been subjected to the descreening (step S209).

If it is determined that there remains no image data that has not been subjected to the descreening in step S209 (if it is determined NO in step S209), the process ends.

If it is determined that there remains any image data that has not been subjected to the descreening in step S209 (if it is determined YES in step S209), the process from step S202 to step S209 is performed again. However, the image data selected in the image data selection step (step S202) is the one of the image data for the four colors of C, M, Y and K input to the descreening apparatus that has not been subjected to the descreening. Then, when all the image data for the four colors of C, M, Y and K input to the descreening apparatus are subjected to the descreening, this process ends.

Such a descreening can effectively smooth the dot structure of the dot image.

Now, a second descreening processing, which differs from the first descreening processing described above, will be described. The second descreening processing described below corresponds to an operation of a second descreening apparatus implemented by the workstation 20 shown in FIGS. 1 and 2 with a second descreening program different from the first descreening program 520 shown in FIG. 4 installed and executed therein. Here, the dot analysis program incorporated in the second descreening program is equivalent to the dot analysis program 530 incorporated in the first descreening program 520 shown in FIG. 4.

Figure 14:
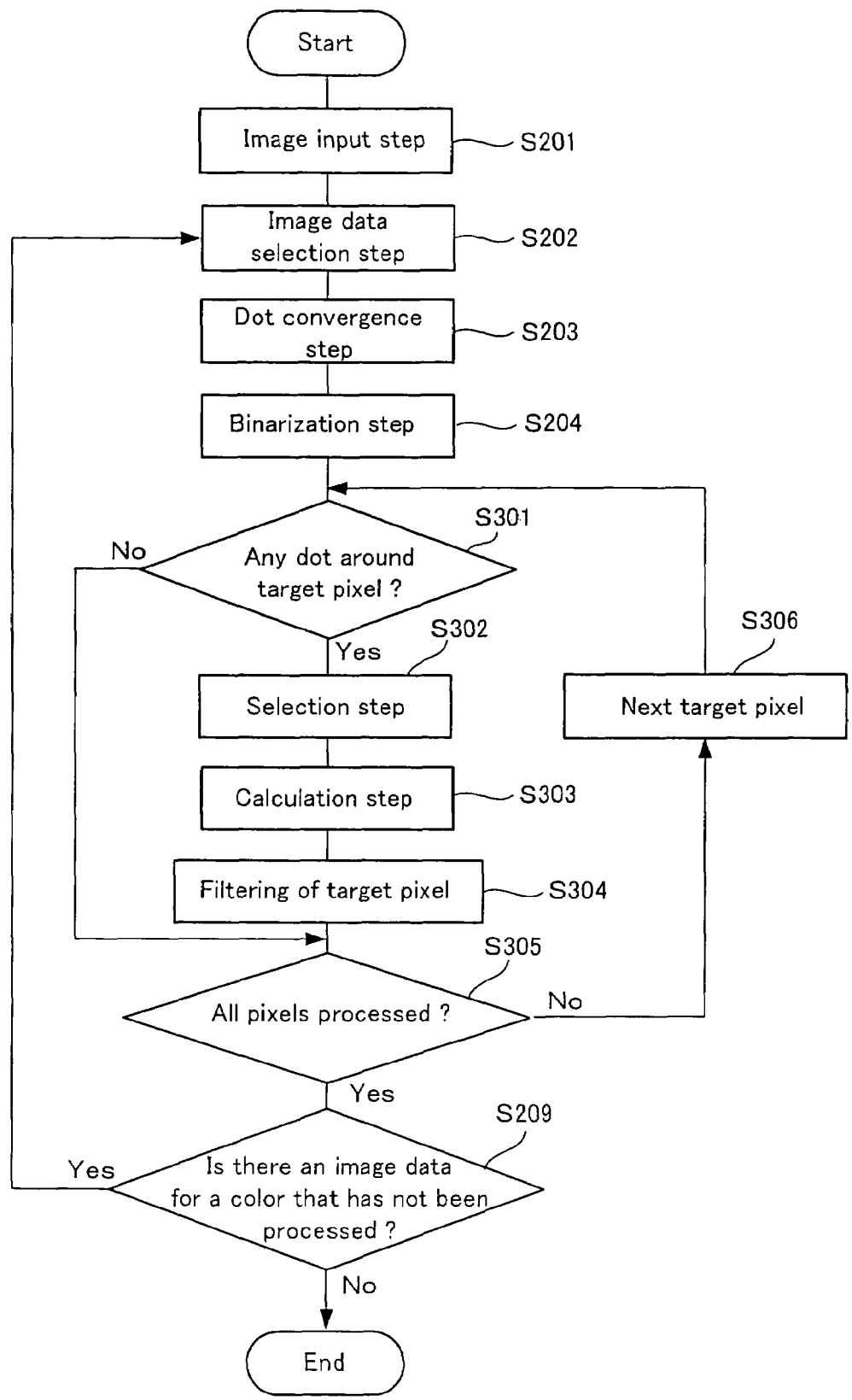
FIG. 14 is a flowchart for illustrating a second descreening processing.

FIG. 14 is a flowchart illustrating the second descreening processing.

The descreening processing illustrated in the flowchart of FIG. 14 is one to be performed on a dot image including an area of other elements than dots (an blank area, an area of characters or the like). When processing such a dot image, it is desired that the descreening processing is efficiently accomplished by performing the processing only on the pixels corresponding to the area of the dot structure, excluding the pixels corresponding to the area of the other elements. Thus, as described below, the descreening processing illustrated in the flowchart of FIG. 14 is a data processing in which it is determined whether each pixel forming the image is included in the area of the dot structure or not, and the descreening processing is performed only on the pixels that are determined to be included in the area of the dot structure.

In addition, as with the descreening processing illustrated in the flowchart of FIG. 13, the descreening processing illustrated in the flowchart of FIG. 14 is to be performed on the image data for printing for the four colors of C, M, Y and K.

Here, in the flowchart of FIG. 14, an image input step (step S201) and an image data selection step (step S202) correspond to an example of an image input step of the dot analysis method according to the present invention. A dot convergence step (step S203) and a binarization step (step S204) correspond to an example of a dot convergence step of the dot analysis method according to the present invention. A selection step (step S302) and a calculation step (step S303) correspond to an example of a calculation step of the dot analysis method according to the present invention.

In FIG. 14, the same steps as those in the flowchart of FIG. 13 are denoted by the same reference numerals. In the following, descriptions of these steps will be omitted, and only the steps S301 to S306, which are differences of the flowchart of FIG. 14 from the flowchart of FIG. 13, will be described.

Once the dots converged toward the respective centers are extracted from the target dot image through the dot convergence step (step S203) and the binarization step (step S204), a data processing described below is started.

First, it is determined (step S301) whether there is a dot converged toward the center thereof within a search range centered on a current target pixel to be subjected to a data processing using a conversion filter described later, the target pixel being chosen from the plural pixels forming the dot image to be processed selected in the image data selection step (step S202). This search range is such a one that, if the search range includes a dot structure, just enough dots can be found in searching of the image. For example, the interval between the dots arranged in the dot image to be processed may be predicted before the processing, and a square whose side is the predicted value may be determined as the search range, for example.

If it is determined that there is a dot within the search range in the determination processing in step S301 (if it is determined YES in step S301), the selection step (step S302) is conducted in which the dot closest to the target pixel is adopted as the main dot, and one dot unit consisting of the main dot and plural sub-dots surrounding the main dot. Then, the calculation step (step S303) is conducted in which the intervals between the main dot and the sub-dots of the dot unit and the direction of arrangement of the main dot and the sub-dots of the dot unit are calculated. Then, an appropriate conversion filter for the calculated intervals and direction is prepared, and a data processing using the conversion filter is performed on the current target pixel (step S304).

In this way, through steps S301 to S304, dot searching within the search range around the target pixel and filtering based on the result of the search are performed. The combination of the dot searching and the filtering based on the search result characterizes the second descreening processing illustrated in the flowchart of FIG. 14. According to this characteristic, pixels corresponding to the area of elements other than dots, such as a blank area, in the image to be processed require no filtering, and thus, the descreening processing can be performed more efficiently.

If it is determined that no dot is included in the predetermined range described above in the determination processing in step S301 (if it is determined NO in step S301), or when the processing in step S304 is completed, it is determined whether the dot searching and the required filtering are performed on all the pixels forming the dot image to be processed through steps S301 to S304 (step S305).

If it is determined that the processings described above are performed on all the pixels in the determination processing in step S305 (if it is determined YES in step S305), a determination processing is performed in step S209. As described earlier with reference to FIG. 13, this determination processing assures that the dot searching and the required filtering are performed on all the image data for the four colors of C, M, Y and K input in the image input step (step S201).

If it is determined that there remains a pixel that has not been processed in the determination processing in step S305 (if it is determined NO in step S305), a pixel adjacent to the current target pixel that has not been processed is selected as the next target pixel (step S306), the dot searching and the required filtering are performed on the next target pixel through steps S301 to S304, and then, it is determined again whether there remains a pixel that has not been processed in step S305.

The determination of whether there remains a pixel that has not been processed (step S305) assures that the dot searching and the filtering based on the search result in steps S301 to S304 are performed on all the pixels forming the dot image.

Due to the characteristic dot searching and filtering based on the search result performed in steps S301 to S304, the descreening processing illustrated in the flowchart of FIG. 14 can be performed on the dot image to be processed more efficiently.

In the above description, as a filter used in the filtering in the first and second descreening processings, the conversion filter F described with reference to FIG. 15 is used as an example. However, the configuration of the filter used in the filtering described above is not limited to that shown in FIG. 15. In the following, there will be described an embodiment using a conversion filter having a configuration different from that of the conversion filter F. However, in this embodiment, except the configuration of the conversion filter and the filtering processing using the conversion filter, the descreening processing is the same as the first and second descreening processings described above. Thus, only the configuration of the conversion filter and the filtering processing using the conversion filter will be described herein.

Figure 16:
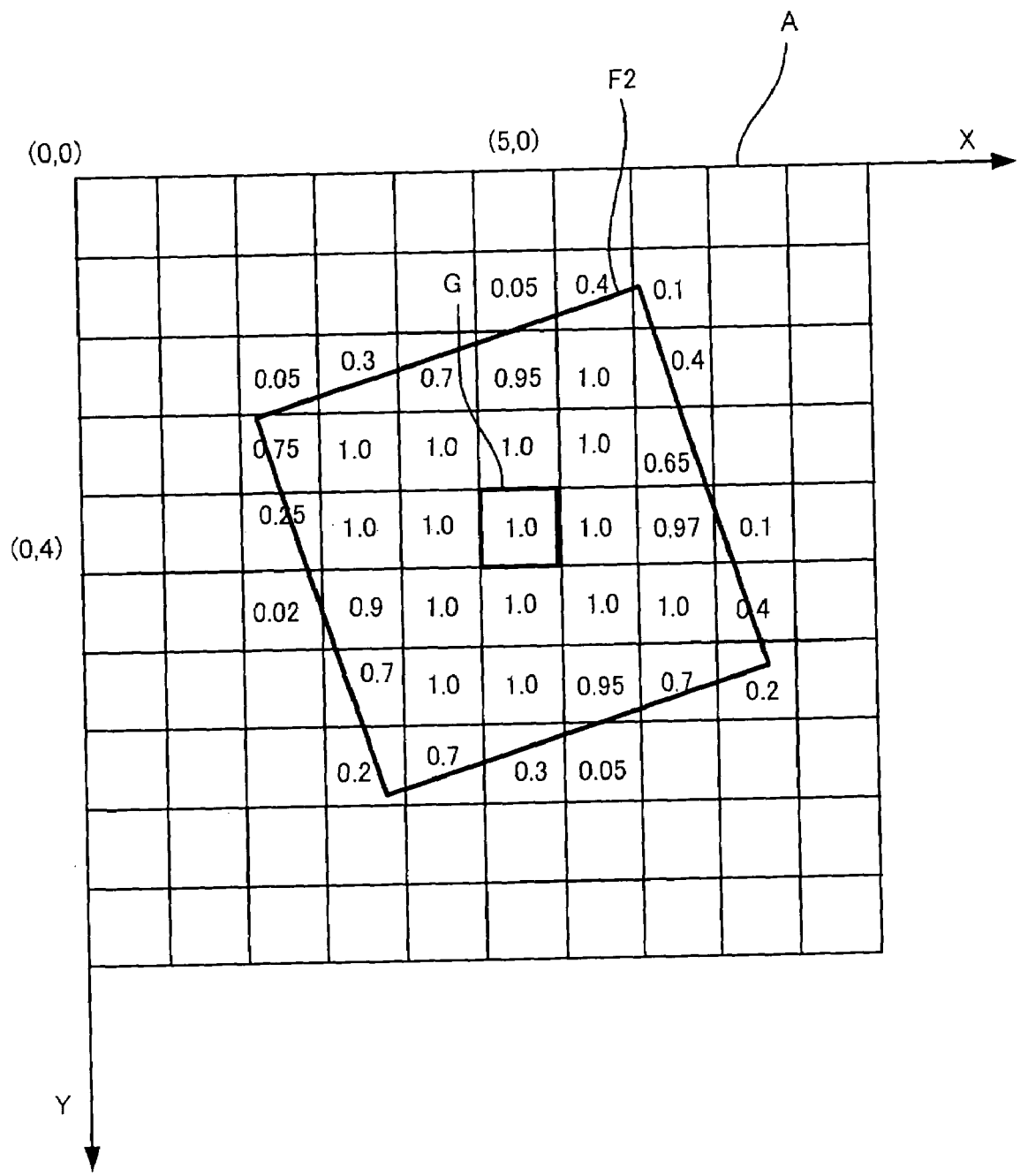
FIG. 16 shows another example of the conversion filter used in filtering in a descreening processing.

FIG. 16 shows another example of the conversion filter used in filtering in the descreening processing.

A conversion filter F2 shown in FIG. 16 has a square whose side has a length equal to the interval between the regularly arranged dots forming a dot image A to be processed and is oriented in the direction of arrangement of the dots.

FIG. 16 shows a filtering processing using the conversion filter F2 performed on a pixel G whose X and Y coordinates are (5, 4).

First, of the pixels forming the dot image A, for each of the pixels overlapping the conversion filter F2, the area overlapping the conversion filter F2 is calculated. Here, the area calculated is represented in terms of ratio in which the area of a totally overlapping pixel with the conversion filter F2 is defined as 1.0. FIG. 16 shows the overlapping areas of all the pixels around the pixel G that overlap with the conversion filter F2.

Then, for each of the pixels for which the overlapping areas are calculated, the overlapping area of the pixel is multiplied by the numeric data of the pixel. The products are summed, the sum is divided by the area of the conversion filter F2, and the numeric data of the pixel G to be processed is replaced with the quotient. The series of processings is to calculate the average value of all the numeric data of the pixels within the range overlapping with the conversion filter F2 that is weighted based on the degree of overlapping of each pixel with the conversion filter F2. Thus, the numeric data of the pixel G to be processed is replaced with the average value.

By performing such a processing using the conversion filter F2 on all the pixels forming the dot image A, the numeric data of the pixels are all averaged to the average value described above. In this way, the dot structure of the dot image A is efficiently smoothed.

In the above description, the descreening processing is taken as an application of the present invention. However, the application of the present invention is not limited thereto. For example, the present invention can be applied to electronic scaling of a dot image as described below.

As is generally known, when an image represented by a two-dimensional array of plural pixels assigned with numeric data is scaled up or down, even if it is not a dot image, a periodic spatial structure may appear in the resulting image. If the image to be scaled up or down has a dot structure, the periodic spatial structure and the dot structure interfere with each other, and thus, the resulting image may be degraded in quality, for example, moiré fringes may appear in the resulting image. Since the appearance of the moiré fringes depends on the relationship between the period of the spatial structure resulting from the scaling and the period of the dot structure of the image, if the interval between dots or direction of arrangement of dots of the dot structure of the original dot image is previously known, the scaling factor that causes moiré fringes in the dot image can be predicted. Therefore, by analyzing the dot structure of the original dot image using the dot analysis apparatus, the dot analysis program and the dot analysis method according to the present invention, the image can be scaled up or down while reducing the occurrence of moiré fringes.

What is claimed is:

1. A dot analysis apparatus that determines an interval between regularly arranged dots that represent a dot image and a direction of the regular arrangement of the dots, comprising:
    a dot converging section that converges the individual dots forming the dot image toward respective centers; and
    a computing section that calculates an interval between the regularly arranged dots forming the dot image and a direction of the regular arrangement of the dots based on a plurality of dots converged by the dot converging section,
    wherein the calculated interval and the calculated direction are used for de-screening an image data corresponding to the dot image.

2. The dot analysis apparatus according to claim 1, wherein the computing section further comprises:
    a selecting section that selects a dot unit from the plurality of dots converged by the dot converging section, the dot unit consisting of one main dot and a plurality of sub-dots surrounding the main dot; and
    a calculating section that calculates intervals between the main dot and the sub-dots of the dot unit selected by the selecting section and directions of arrangement of the main dot and the sub-dots and calculates the interval between the regularly arranged dots forming the entire dot image and the direction of the regular arrangement of the dots based on the calculation result.

3. The dot analysis apparatus according to claim 2, wherein, in the computing section,
    the selecting section selects a plurality of dot units,
    the calculating section calculates intervals between the main dot and the sub-dots of each of the plurality of dot units selected by the selecting section and directions of arrangement of the main dot and the sub-dots of each of the plurality of dot units, and
    the computing section further comprises a statistic processing section that determines statistic distributions of the interval and direction calculated for each dot unit and determines an interval and a direction corresponding to peaks of the respective distributions as the interval between the regularly arranged dots forming said dot image and the direction of the regular arrangement of the dots, respectively.

4. A computer readable storage medium that stores a dot analysis program that, when executed by a computer, performs a method of determining an interval between regularly arranged dots that represent a dot image and a direction of the regular arrangement of the dots, the program comprising:
    converging the individual dots forming the dot image toward respective centers; and
    calculating an interval between the regularly arranged dots forming the dot image and a direction of the regular arrangement of the dots based on a plurality of dots converged by the step of converging the individual dots,
    wherein the calculated interval and the calculated direction are used for de-screening an image data corresponding to the dot image.

5. A dot analysis method implemented on a dot analysis apparatus of determining an interval between regularly arranged dots that represent a dot image and a direction of the regular arrangement of the dots, comprising the steps of:
    converging the individual dots forming the dot image toward respective centers; and
    calculating an interval between the regularly arranged dots forming the dot image and a direction of the regular arrangement of the dots based on a plurality of dots converged by the step of converging the individual dots,
    wherein the calculated interval and the calculated direction are used for de-screening an image data corresponding to the dot image.

6. The dot analysis apparatus according to claim 1, wherein the dot converging section assigns, if any of eight pixels surrounding a target pixel has a numeric value equal to or greater than the numeric value of the target pixel, the target pixel with the minimum of the numeric value of the surrounding eight pixels.

7. The dot analysis apparatus according to claim 6, wherein the dot converging section repeatedly assigns the target pixel with the minimum of the numeric value of the surrounding eight pixels for a predetermined number of times.

8. The dot analysis apparatus according to claim 1, wherein the interval corresponds to distance between the arranged dots and the direction corresponds to angle between the arranged dots.

9. The dot analysis apparatus according to claim 1, further comprises a filtering section which filters image data based on the interval between the regularly arranged dots forming the dot image and the direction of the regular arrangement of the dots.

10. The dot analysis apparatus according to claim 1, wherein the computing section calculates the interval the direction only if pixels are included in an area of the dot structure.

11. The dot analysis apparatus according to claim 2, wherein a dot closest to a target pixel is adopted as the main dot.

12. The dot analysis apparatus according to claim 1, wherein the computing section further comprises performing binarization on the dots converged by the dot converging section, wherein numeric value of pixels equal to or greater than a threshold are replaced with "1", and numeric value of pixels less than the threshold is replaced with "0".

13. The dot analysis apparatus according to claim 1, wherein the dot converging section determines if any of the adjacent pixels surrounding a target pixel has a numeric value equal to or greater than a numeric value of the target pixel, and
    assigns the target pixel with the minimum of the numeric value of the surrounding adjacent pixels, if any of the adjacent pixels surrounding a target pixel has the numeric value equal to or greater than the numeric value of the target pixel.

14. The dot analysis apparatus according to claim 1, wherein the computing section calculates the interval between the regularly arranged dots forming the dot image and the direction of the regular arrangement of the dots after the dot converging section converges the individual dots forming the dot image toward the respective center.

15. The dot analysis apparatus according to claim 1, wherein the computing section uses the plurality of converged dots to calculate the interval between the regularly arranged dots forming the dot image and the direction of the regular arrangement of the dots.

* * * * *